April 25, 1961  F. W. PAUL ET AL  2,981,296
ELECTRIC PROTECTION FOR LOOM
Filed Nov. 12, 1959
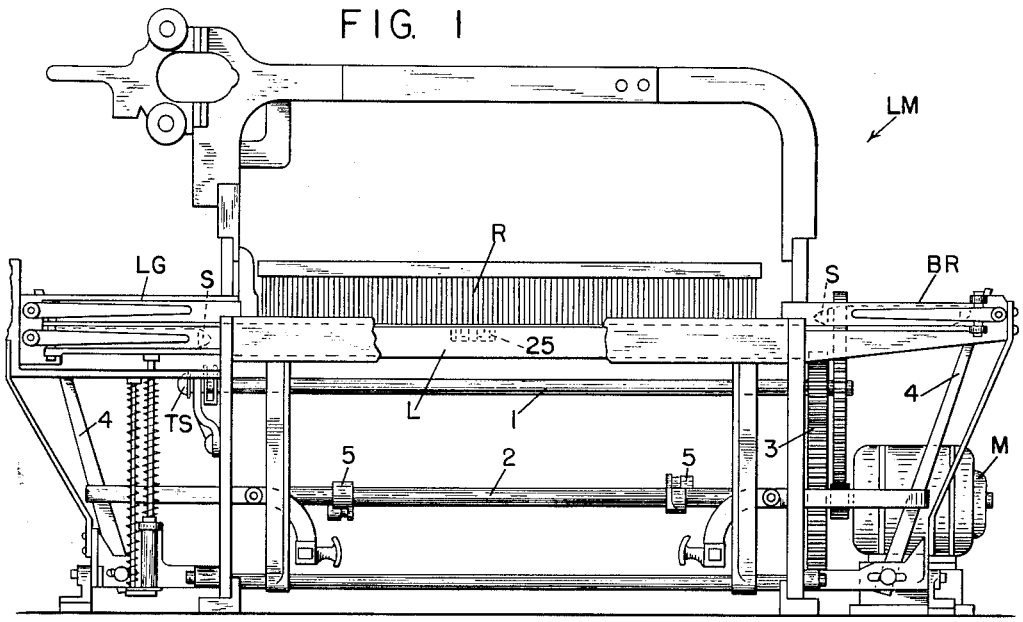
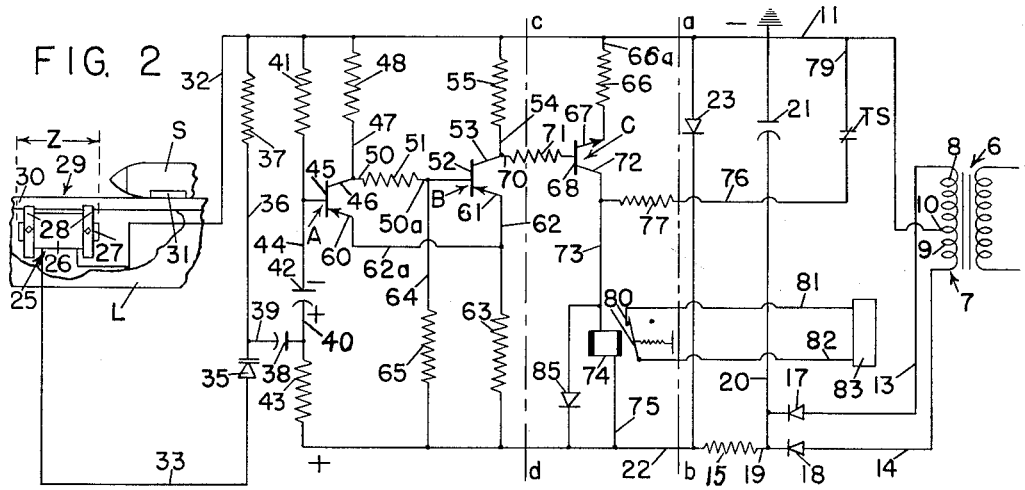
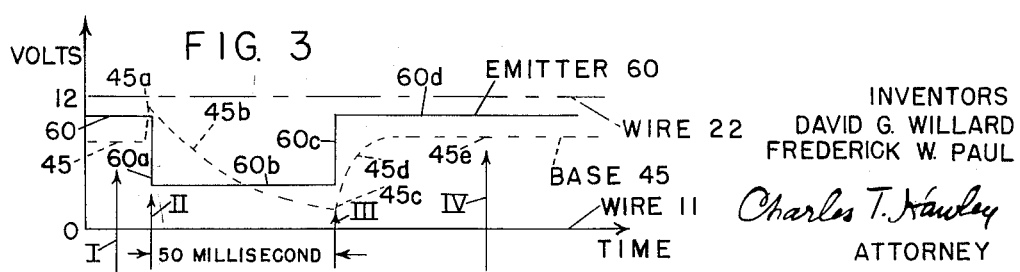
INVENTORS
DAVID G. WILLARD
FREDERICK W. PAUL
Charles T. Hawley
ATTORNEY

United States Patent Office 2,981,296
Patented Apr. 25, 1961

2,981,296
ELECTRIC PROTECTION FOR LOOM

Frederick W. Paul, Holden, and David G. Willard, Worcester, Mass., assignors to Crompton & Knowles Corporation, Worcester, Mass., a corporation of Massachusetts Filed Nov. 12, 1959, Ser. No. 852,490
9 Claims. (Cl. 139—341)

This invention relates to electric protection means to stop a loom to prevent a shuttle smash if the shuttle is running late.

Looms have been built employing a permanent magnet and coil in the lay and a shuttle which, when passing over the magnet, induces an electric impulse in the coil to cause either an electronic or a simple electric circuit to energize a relay to effect continued loom operation, provided the shuttle is running on time. U.S. Patent Nos. 2,856,335 and 2,781,794 show these types of circuits.

The electronic circuit utilizes a tube which has a short life due to vibration of the loom and occupies too much space especially when used on small looms. Also, the necessary voltages are high enough to require compliance with strict electric wiring codes. When the electric circuit is used the shuttle must pass closer to the coil than is feasible when weaving certain types of fabrics, and the lay is weakened by the long slot required for the large magnet. In both types of circuit the cost of the equipment is too high for short looms in the 40 to 100 inch width range.

It is the general object of the present invention to provide protection means free from the foregoing defects and operating at low voltage, occupying small space, permitting a large air gap between the shuttle and coil, able to withstand the vibration incident to high speed loom operation, and causing little or no weakening of the lay.

It is an important object of the invention to attain the foregoing advantages by the use of electric circuit means employing transistors.

It is another object of the invention to use a form of diode known as a "Stabistor," to prevent transient electric currents from actuating the sensitive transistor circuits.

Looms of the kind mentioned have used a regularly opening and closing timer switch and a relay which has been energized and deenergized each beat of the loom so that its switch is constantly closing and opening. It is another object of the present invention to provide an electric circuit wherein the relay will be energized whenever the timer switch is closed and will continue to be energized when the timer switch opens, provided the shuttle is running on time. This arrangement permits the use of a smaller relay.

It is a further object of the invention to provide an electric circuit having a transistor which will be normally conducting throughout the greater part of each one-pick cycle of the loom but when the impulse is received from the pick-up coil on the lay will be made nonconducting and cause other parts of the circuit to continue energization of the relay.

It is another object of the invention to provide circuitry for at least two transistors with electric condenser means normally in a state of stable charge, a condition which enables the aforesaid transistor to remain conductive. When the impulse is received from the pick-up coil it produces a change in the conducting transistor which stops it from conducting and thereby makes conductive another transistor in series with the relay. These changes persist until the condenser means is restored to normal stable condition, thereby providing time for opening and closing the timer switch and providing for some variation in shuttle flight time.

In order that the invention may be clearly understood reference is made to the accompanying drawings which illustrate by way of example the embodiments of the invention and in which:

Fig. 1 is a diagrammatic elevation of a loom having the invention applied thereto, Fig. 2 is a diagrammatic view showing the circuitry used for the invention, and Fig. 3 is a graph illustrating the operation of the transistors.

The loom LM is provided with a lay L which swings backwardly and forwardly in the usual manner and has a right-hand shuttle box BR and a left-hand gang of shuttle boxes LG. The loom has top and bottom shafts 1 and 2 connected by gearing 3 which causes the bottom shaft to rotate once for each two rotations of the top shaft.

Each end of the loom is provided with a picker stick 4 and the bottom shaft has cams 5 which are effective to cause the picker sticks to act in alternation, the picker stick at the right end acting to propel a shuttle S across the lay to the gang LG on one beat of the loom and the picker stick at the left-hand end of the loom being effective on the next beat of the loom to pick a shuttle from the gang LG to the box BR. A motor M is shown for driving the loom, this motor being under control of the circuit shown in Fig. 2, as will be described. The lay has a reed R along which the shuttle travels from one side to the other side of the loom. The top shaft operates a timer switch TS which is closed during the greater part of the rotation of the top shaft but opens momentarily when the shuttle, if on time, reaches a predetermined point along the length of the lay.

In Fig. 2, the transformer 6 has a secondary winding 7 divided into upper and lower coils 8 and 9 respectively and having a center tap 10. This tap is connected to grounded line wire 11 and coils 8 and 9 are connected by wires 13 and 14 to rectifiers 17 and 18 respectively and through them to wire 19 and also to wire 20 leading to one side of a polarized condenser 21 the other side of which is connected to grounded wire 11. Wire 19 is connected through a 470 ohm resistance to line wire 22. A 470 ohm resistance 15 is connected between wires 20 and 22. A zener diode 23 acting as a voltage regulator is connected across wires 11 and 22 and maintains the voltage across these lines at 12½ volts plus or minus 10%.

The parts thus far described to the right of vertical dot and dash line a—b, Fig. 2, may be considered to be a standard electric power supply which maintains a well regulated direct current voltage supply across line wires 11 and 22.

The part of Fig. 2 to the left of vertical dot and dash line c—d may be considered as the pulse amplifier and delay part of the circuit. At the extreme left of Fig. 2 is indicated a form of electric impulse generator 25, by way of example, having a coil 26 surrounding a permanent magnet core 27. Two magnetic pole pieces 28 secured to the core lie just under the top surface 29 of a raceplate 30 of the loom lay L on which the shuttle S rides. The generator 25 is located in a zone Z extending along the lay and a magnetic body 31 on the shuttle when passing through the zone and over the pole pieces causes an electric impulse of about one volt to be generated in the coil. One side of the coil is connected by wire 32 to grounded wire 11.

The other side of the coil 26 is connected by wire 33 to one side of the germanium or silicon diode 35, known as a "Stabistor" and procurable from Transistron Electronic Corporation, Melrose, Mass., U.S.A. This diode acts not only as a one-way rectifier, suppressing the negative wave of the impulse, but also as a voltage threshold below which it will not allow current to pass. The diode used in developing the invention required an impulse voltage of 0.6 volt. Any lower voltage is ineffective to cause current to pass through the diode. The other side of the "Stabistor" is connected by wire 36 and 10,000 ohm resistance 37 to line wire 11.

A 0.1 microfarad condenser 38 has one side connected by wire 39 to wire 36 and has its other side connected to wire 40, the latter being connected between wires 11 and 22 and connecting in series a 470,000 ohm resistor 41 near line 11, a polarized 2 microfarad condenser 42, and a 1000 ohm resistance 43 near line 22. Wire 44 connects wire 40 at a point between resistance 41 and condenser 42 to the base 45 of a PNP transistor A. The transistor collector 46 is connected through wire 47 and 10,000 ohm resistance 48 to wire 11. The collector is also connected by wire 50 and 22,000 ohm resistance 51 to base 52 of a second PNP transistor B the collector 53 of which is connected through wire 54 and 2200 ohm resistance to wire 11.

The emitter 60 is connected by wires 62a and 62 to 100 ohm resistance 63 and thence to wire 22. Emitter 61 is connected to wire 62 and thence to line 22, as shown. A wire 64 and 22,000 ohm resistance 65 connects wire 22 to a point in wire 50a between resistance 51 and transistor B.

The relay and control transistor part of the circuit shown in Fig. 2 is between the lines a—b and c—d and includes a wire 66a connected to line 11 and 150 ohm resistance 66 connected to emitter 67 of an NPN transistor C. Base 68 of transistor C is connected to the collector 53 of translator B and to wire 54 by wire 70 and 15,000 ohm resistance 71. The collector 72 of transistor C is connected by wire 73 to one side of relay 74 the other side of which is connected by wire 75 to wire 22. Wire 73 is connected by wire 76 and 150 ohm resistance 77 to one side of the timer switch TS the other side of which is connected by wire 79 to line 11. The relay has contacts 80 which are closed when the relay is energized and these contacts are connected by wires 81 and 82 to loom control means 83 which can effect continued loom operation so long as the contacts are closed. A diode 85 is in parallel with the relay as shown in Fig. 2.

For convenience in illustration the timer switch TS and control 83 are shown to the right of line a—b, but these parts belong properly with the relay and control part of the circuit shown in Fig. 2. It is to be understood that the timer switch is closed during the greater part of each one-pick cycle of the loom and opens only at a predetermined time when the shuttle should have reached a given point in its travel across the lay.

In describing the operation of the invention it will be assumed that the normal condition of the circuits will be that which exists while the timer switch is closed. Under this condition a circuit will be completed from wire 22, wire 75, relay 74, wire 73, 150 ohm resistance 77, wire 76 and timer switch TS to line 11. This will energize the relay and keep the contacts 80 closed and control 83 will effect continued loom running. The coil 26 is deenergized at this time, and condensers 38 and 42 are charged to their steady state value. Transistor A is conducting maximum current through a circuit including line 22, resistance 63, wires 62 and 62a, emitter 60, base 45, collector 46, wire 47 and resistance 48 to line 11. A preliminary condition necessary to enable current to flow in this circuit is that a small current shall flow from line 22 through resistance 63, wires 62 and 62a, emitter 60, base 45, wires 44 and 40, and resistance 41 to line 11. Transistor A is therefore conducting under normal conditions. Wire 44 is more negative than emitter 60, hence current flows as already traced through this PNP transistor, wire 22 being considered positive and wire 11 being considered negative and grounded.

Transistor B, also of the PNP type, is not conducting under this normal condition because part 50a of wire 50 is not sufficiently more negative than emitter 61 to allow current to pass, and as a result there is minimum or negligible current flowing through wire 54 and resistance 55. As a result of the condition of transistor B just described, base 68 of transistor C is insufficiently positive with respect to emitter 67 for appreciable current to flow through resistance 66 and wire 65. Therefore transistors B and C are not conducting under normal conditions.

If the shuttle is running correctly it will generate an electric impulse in coil 26 before the timing switch TS opens. The positive part of this impulse is able to get through the stabistor 35, having 0.6 volt subtracted from its generated value, that is, the voltage at wire 39 will be the drop between wires 11 and 33 less 0.6 volt. Thus, if the voltage developed in coil 26 is one volt, the net voltage between wires 39 and 11 will be 0.4 volt.

The reduced impulse reaching wire 39 is transferred across condenser 38, wire 39 being now less negative than the condenser 38, making the right-hand part of this condenser more positive. As a result of this condition the positive side of condenser 42 becomes more positive and its negative side becomes less negative, making wire 44 less negative so that the base 45 is not sufficiently negative with respect to emitter 60 for continued flow of current through transistor A, that is, the latter temporarily becomes nonconducting.

When transistor A was previously conducting current was passing through resistance 48 and there was a considerable voltage drop across it, since resistance 63 is low. Transistor A then acted as a short circuit across resistance 51, wire 50a, wire 64 and resistance 65, current in this short circuit flowing from wire 22 through resistance 63, wires 62 and 62a, emitter 60, base 45, collector 46, wire 47, and resistance 48 to wire 11. With transistor A now being nonconducting, this short circuit is removed and current now flows from wire 22 through resistance 65, wires 64 and 50a, resistance 51, wires 50 and 47 and resistance 48 to wire 11. The voltage of wire 50a and base 52 is now much lower than it was and transistor B can conduct. Current will now flow through a circuit including wire 22, resistance 63, wire 62, transistor B, wire 54 and resistance 55 to wire 11. Therefore, wire 70 will be more positive than it was, since resistance 55 is twenty times or so as large as resistance 63, and base 68 of NPN transistor C will be sufficiently positive with respect to emitter 67 so that current can flow through it and current will flow from wire 22, through wire 75, relay 74, wire 73, collector 72 of transistor C, base 68, emitter 67, resistance 66 and wire 66a to line 11. The result of current flowing in this circuit is that relay 74 is energized. The relay has a resistance of about 2000 ohms.

The impulse generated in coil 26 which turned off transistor A is of brief duration and it is desirable to provide means for prolonging the energization of the relay until the timer switch can close. It will be apparent that when transistor B is conducting there is more current flowing through resistance 63 than was flowing through it when transistor A was conducting due to the fact that resistance 55 is considerably smaller than resistance 48. Wire 62 and emitter 60 are therefore more negative than they were with respect to wire 22.

The behavior of base 45 is shown in Fig. 3. In this figure lines 11 and 22 represent zero and 12 volt levels, respectively, solid line 60 represents the voltage of the emitter 60, and dashed line 45 represents the voltage of base 45. The vertical lines I and IV represent the normal conditions before the impulse is received and after return of the emitter and base to normal conditions, respectively. At line I the base is negative to the emitter. When the impulse is received from the coil 26 the base 45 becomes more positive with respect to emitter 60, see rising line 45a, and this difference in voltage is further increased when emitter 60 becomes more negative with respect to wire 22 as transistor B conducts, see descending line 60a at vertical line II. The emitter voltage drops promptly to line 60b and line 45b begins to drop toward the negative. The transistor A stops conducting at line II, Fig. 3, and resumes conducting at line III.

In order for this circuit to revert to its normal condition, i.e., to the line IV, Fig. 3, with transistor A again conducting and transistor B again nonconducting, base 45 must again become more negative than emitter 60 by about the same amount as shown at the left of Fig. 3. Since the voltage of emitter 60 is held reasonably constant at line 60b extending from line II to line III by transistor B, and since the voltage of base 45 is determined by the charge time of condenser 42 and associated series resistance paths, a controllable time, from II to III, Fig. 3, takes place with the base becoming progressively more negative until it falls to point 45c where it is as negative relative to line 60b as line 45 is relative to line 60 at the left of Fig. 3. The base is now sufficiently negative relative to the emitter to enable transistor A to conduct, reestablishing the normal short circuit condition across resistance 51, wire 50a, wire 64 and resistance 65, and causing transistor B to stop conducting. With transistor B nonconducting the voltage drop across resistor 55 is insufficiently positive to hold base 68 at its previous level and transistor C becomes nonconducting and relay 74 is deenergized.

The distance between lines II and III, Fig. 3, represents a time lag approximately equal to the time switch TS is open and is determined by the time required to restore the condensers 38 and 42 to their steady state value of charge. During this time condenser 38 is recharged through resistances 43 and 37, about 11,000 ohms, and it recharges quickly and when fully charged blocks off further flow of current through resistance 37. The only path now open for current flowing through resistance 43 is through the high resistance 41. Because of the fact that condenser 42 is comparatively large relative to condenser 38 and resistance 41 is high, an appreciable time is required to restore condenser 42 to its steady state value of charge. This time, from line II to line III, Fig. 3, is about 50 milliseconds, the time during which relay 74 is energized by current flowing through transistor C.

Returning to Fig. 3, when the voltage of base 45 reaches point 45c the emitter voltage is immediately restored, see line 60c, to its normal value, see line 60d. The base then returns by line 45d to its normal voltage, see line 45e. At IV, Fig. 3, the circuits are all restored to their normal condition in readiness for the next impulse from coil 26.

In the foregoing description specific values of resistances, condensers, voltages, etc. have been described but these values are to be considered only as examples and the invention is not to be limited to the various values given. Also, so far as Fig. 3 is concerned, the voltages mentioned are those which were used and the time lag of 50 milliseconds was chosen because of the time during which the timer switch is open. The voltages indicated and the time lag are to be considered as examples. If a loom equipped with the invention is to operate under different speed conditions the time lag can be varied from that specified by changing the condenser 42 and resistance 41.

From the foregoing it will be seen that the invention sets forth an electric loom protection utilizing electric currents of very small value and avoids the use of large permanent magnets and also eliminates the use of electronic tubes. The transistors A, B and C are very small, as are also the other parts of the circuit, and can be confined to a small box of approximately 5 cubic inches capacity, only a fraction of the size of the containers needed heretofore for those types of protections which are triggered or tripped by a shuttle passing over a coil in the lay. It will also be seen that the invention makes use of normally charged condensers, this feature being, it is believed, new in electric protection of the general type to which this invention relates. The diode 35 prevents stray currents from triggering the circuit into action. The relay is normally energized by the timer switch TS and its energization is continued by the transistor C if the shuttle is running on time.

Having now particularly described and ascertained the nature of the invention and in what manner the same is to be performed, what is claimed is:

1. In protection means for a loom having a normally closed timer switch which opens at regular intervals during loom operation and having also a shuttle which when running properly generates an impulse in the coil located along the path thereof just prior to each interval, the loom having a relay which if energized during said intervals permits continued loom operation, positive and negative electric power source lines, a polarized condenser between two resistances connected in series therewith across said lines, a transistor between and connected in series with two other resistances across said lines, the base of the transistor being connected to the negative side of the condenser, a second transistor connected across said lines and in series with the aforementioned relay, the condenser normally being in a steady state of charge and maintaining the base of the first transistor sufficiently negative with respect to the emitter thereof to permit current to flow from said lines through said first transistor, the second transistor being normally nonconducting, electric connections between the coil and the condenser effective when an impulse is generated in the coil by the shuttle to alter the charge of the condenser in such manner as to change the electric potential of the base of the first transistor to prevent the latter from conducting, a diode in said electric connections preventing flow of electric current if below a given voltage and electric means connected between the transistors effective when the first transistor is prevented from conducting current to enable the second transistor to conduct current and thereby energize the relay, the condenser and the first two named resistances cooperating thereafter to restore the condenser to the normal steady state of charge thereof, thereby enabling the first transistor again to conduct, and electric means preventing conduction through the second transistor when the first transistor again conducts, the time required for the condenser to be restored to the normal steady state of charge thereof being equal at least to the duration of said interval.

2. In protection means for a loom having a normally closed timer switch which opens at regular intervals during loom operation and having also a shuttle which when running properly effects generation of an electric impulse in a coil just prior to the beginning of an interval, the loom having also a relay which must be energized during each interval to permit continued running of the loom, electric circuit means including negatively and positively charged electric power source lines, a condenser connected between and in series with two resistances of unequal value across said lines and normally having a steady state value of charge, the larger resistance being between the condenser and the negatively charged line, a transistor connected across said lines in series with other resistances, one on each side thereof, the negative side of the condenser being connected to the base of the transistor and maintaining the latter sufficiently negative with respect to the emitter of the transistor to enable current normally to flow through the transistor, a second transistor in said circuit means controlled by the first transistor connected in series with the relay across said lines, the first transistor when conducting preventing the second transistor from conducting and the second transistor conducting when the first transistor is prevented from conducting, a diode connected between the coil and condenser preventing flow of electric current if below a given voltage, an electric impulse when generated in the coil and passing through the diode being transmitted to the condenser and creating therein an altered state of charge which changes the electric potential of the base of the first transistor sufficiently to prevent the latter transistor from conducting current, whereupon the second transistor becomes conductive to energize the relay, the first resistances and condenser cooperating thereafter to restore the condenser to the condition of its normal steady state value of charge during a time equal at least to the time of an interval, whereupon the first transistor again becomes conductive and the second transistor becomes nonconductive.

3. The electric protection means set forth in claim 2 wherein the first transistor is of the PNP type and the second transistor is of the NPN type and electric means in the circuit means causes the base of the second transistor to become sufficiently positive with respect to the emitter thereof to conduct current when the first transistor is prevented from conducting current.

4. The electric protection means set forth in claim 2 wherein the voltage across said lines is approximately 12 volts and the condenser has a capacity of the order of two microfarads and the resistance between the condenser and the negative line has a resistance of from 400,000 to 500,000 ohms and the other resistance in series with the condenser between the latter and the positive line has a resistance of the order of 1,000 ohms.

5. The electric protection means for a loom as set forth in claim 2 wherein a diode is connected between the coil and the condenser and prevents reverse flow of current from the condenser to the coil.

6. The electric protection means set forth in claim 5 wherein the diode requires the impulse to have a voltage in excess of approximately one-half a volt and the voltage across said lines is approximately 12 volts.

7. In protection means for a loom having a source of direct current electric power and a coil on the lay thereof and having also a relay to be energized at regular intervals, electric means intermediate the coil and relay comprising a small fractional microfarad electric condenser, a first transistor connected across said source of electric power and normally conducting electric current, a diode connecting one side of the coil to one side of the condenser effective to prevent flow of electric current to the condenser if below a given voltage, a second larger condenser connected across said source in series with and between two resistances and connected to the first condenser between itself and one of the resistances and connected to the transistor between itself and the other resistance, a second transistor connected across said source but normally nonconducting due to an electric connection with the first transistor, a third transistor connected across said source in series with the relay connected to the second transistor and normally nonconducting, an electric impulse from the coil at a voltage equal to or greater than said given voltage causing the condensers to prevent the first transistor from conducting and the latter transistor thereupon causing the second and third transistors to become conducting with resultant energization of the relay.

8. The protection means set forth in claim 7 wherein the impulse causes the second condenser to acquire a larger charge, thereby enabling it to draw current from said source and the flow of current to the condenser effects a change in the electric condition of a normally nonconducting transistor in such manner as to cause current to flow from said source through the third transistor and relay.

9. The protection means set forth in claim 7 wherein the electric energy required to operate the relay is greater than the energy of the impulse generated in the coil.

References Cited in the file of this patent
UNITED STATES PATENTS

| 2,756,782 | Applegate et al. | July 31, 1956 |
| 2,781,794 | Bordewieck et al. | Feb. 19, 1957 |
| 2,879,456 | Pinckaers | Mar. 24, 1959 |